Oct. 21, 1958  V. L. MATAKAS ET AL  2,856,791
CONTROL KNOB LOCK
Filed July 15, 1955
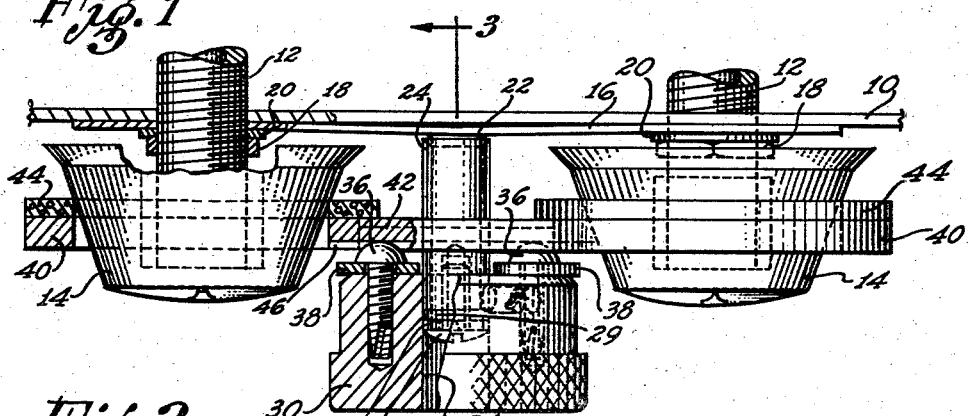
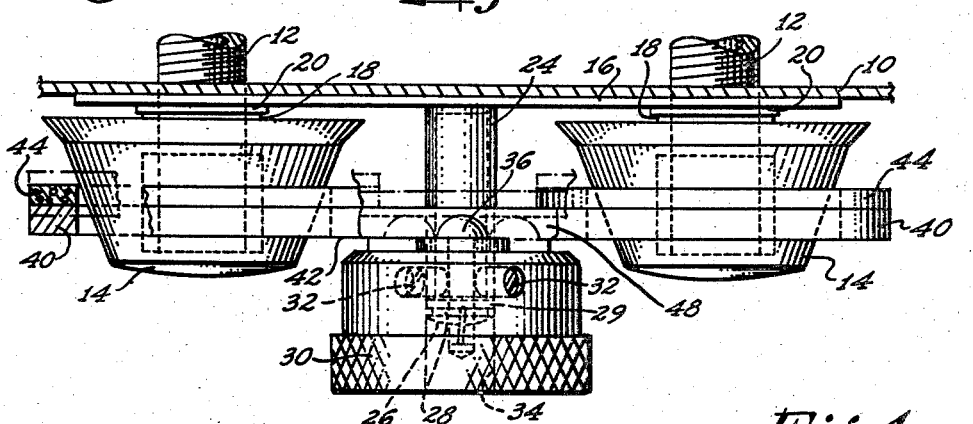
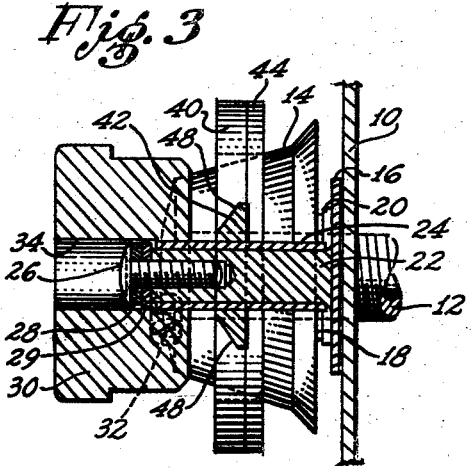
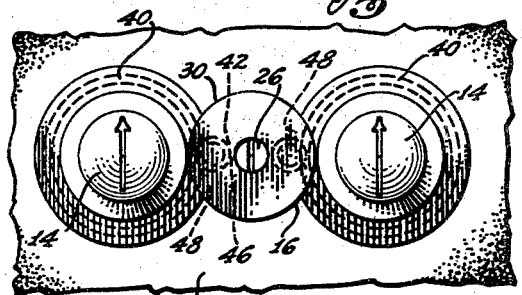
INVENTORS:
Victor L. Matakas
Joseph E. Smith
By Herbert E. Metcalf
Their Patent Attorney United States Patent Office 2,856,791
Patented Oct. 21, 1958

2,856,791

CONTROL KNOB LOCK

Victor L. Matakas, Alamogordo, N. Mex., and Joseph E. Smith, Los Angeles, Calif., assignors to Northrop Aircraft, Inc., Hawthorne, Calif., a corporation of California Application July 15, 1955, Serial No. 522,203

9 Claims. (Cl. 74—504)

This invention has to do with a control knob lock for electronic, hydraulic, pneumatic and mechanical equipment.

Certain equipment having component parts mounted in a container and the like very often are controlled by one or more manually actuated knobs attached to shafts that are in turn connected to the component parts. Under certain circumstances the parts are pre-set, through the medium of the knobs, for a definite reason and to obtain definite and constant results. Altering the setting of the parts disrupts the accurate operation of the equipment and true conditions of operation cannot be obtained. The parts may be dislodged from the predetermined condition by vibration or inadvertent rotation of the control knobs.

The principal object of this invention is to provide a control knob lock that will maintain the control knobs in various equipment in a predetermined set position and resist any normal existing force tending to change the established setting.

Another object of this invention is to provide a knob lock for various equipment that obtains the locking of pre-set control knobs by applying a vertical force that is changed to a force transverse thereto to lock said knobs against any normal force tending to alter the established setting.

A yet further object of this invention is to provide a knob lock that is of simple construction, readily fabricated and maintained and suitable for mass production techniques.

Figure 1 is a fragmentary, cross-sectional view illustrating and having embodied therein the present invention showing the same in control knob locking condition.

Figure 2 is a view similar to Figure 1 but illustrating the present invention in a position where the control knobs are not in a locked condition.

Figure 3 is a fragmentary, cross-sectional view taken on line 3—3 in Figure 1 looking in the direction indicated.

Figure 4 is a fragmentary, generally front view illustrating the present invention.

Referring to the drawings for a more detailed description of the present invention, 10 designates the wall of a container or box that normally has mounted therein component parts. The equipment in the container can be electronic, hydraulic, pneumatic or mechanical in nature.

Extending through the wall 10, as illustrated, are a pair of spaced apart threaded shafts 12 that are connected to the component parts. Attached to each shaft, by any applicable means, are frusto-conical control knobs 14.

Spanning the distance between each shaft, and mounted thereon by openings therethrough, is a flat spring plate 16. Each end of the plate 16 is held against wall 10 by a washer 20 that is caused to bear against the plate 16 by a nut 18 threaded on the shafts 12.

Secured midway between the ends of the plate 16 by welding or other equally applicable means is an internally threaded tube 22.

Telescoped over the tube and rotatable thereabout is a hollow cylinder 24 open at both ends. The cylinder 24 is retained in connecting relationship with the tube by a screw 26 threaded in the latter and bearing against a lock washer 28 and washer 29.

A knurled control knob 30 is releasably attached to the cylinder 24 by set screws 32. It may be seen by referring to Figures 1 to 4 inclusive that a portion of the tube 22, cylinder 24 and screw 26 as well as the lock washer 28 and washer 29 are received in an opening 34 extending through the knob 30.

Mounted in the knob 30 on each side of the cylinder 24 are a pair of threaded detents 36. Disposed between the head of the detents 36 and the knob 30 are washers 38. Spanning the distance between control knobs 14 are a pair of rings 40 interconnected through the medium of a bar 42. Bonded by adhesive or other applicable means about the periphery of each ring, and adjacent each knob is a cushion ring 44 of resilient material. It may be determined by referring to Figures 1 to 4 inclusive that the internal diameter of each ring 40 is greater than the external diameter of the apex of each knob 14, but less than the base.

Also it may be seen by referring to Figures 1 to 4 inclusive that the cylinder 24 and related structure extends through an opening in the bar 42; the opening being midway between the ends of said bar.

Formed in the bar 42 and extending transverse to the longitudinal axis of the cylinder 24 is a groove 46 that receives each of the detents 36 when the control knobs 14 are in the locked condition.

Located on each side of groove 46 and also formed in the bar 42 are a pair of beveled surfaces 48 that receive the detents 36 when the control knobs 14 are in the unlocked condition. The differential in distance between the bottom of the groove 46 and the most extreme point of inclination on the beveled surface 48 is adequate to permit freedom of movement of the rings 40 and bar 42 when the latter two elements are in the unlocked condition.

The operation of the invention is as follows: Assume the control knob lock to be suitably mounted and in the unlocked position illustrated in Figure 2 of the drawings. The spring plate 16 is in a flat condition as illustrated. The detents straddle the notch 46 and are in engagement with the beveled surfaces 48. This condition permits sufficient freedom of movement of the rings and bar 42 to permit the control knobs 14 to be rotated to a predetermined position.

Once the control knobs 14 are set in the desired position the knurled knob 30 is rotated a quarter turn. As a result the detents are urged from the most inclined portion of the beveled surfaces 46 up to the inclination to the crest thereof. The result of this movement of the knob 30 and detents 36 causes a force to be imposed on the bar 42 which is transmitted to the rings 40 to urge them toward the dotted line position illustrated in Figure 2 of the drawings. The rings due to the limit of elasticity of the resilient cushions 44 and resistance of the control knobs 14 is prevented from moving the limit that is being urged by the knob and detents 30 and 36 respectively. However, the transmitted force imposed on the control knobs 14 through the medium of the ring 40 is sufficient to lock them against rotation. The balance of the imposed force is transmitted to the spring plate 16 causing the same to bow away from the wall 10 of the container.

Continued rotation of the knob 30 results in the detents 36 seating and being received in the groove 42. As a result a certain amount of the imposed force is released which permits the spring plate to tend to assume its original flat condition. However, a bow still remains as may be seen by referring to Figure 1 of the drawings.

It is only necessary to rotate the knob 30 a quarter turn to release the control knobs and place the structure again in the condition illustrated in Figure 2 of the drawings.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In equipment having a container for component parts, a plurality of spaced rotatable shafts extending through a wall of said container, a frustro-conical parts control knob on each shaft, a control knob lock comprising a resilient member on and common to each shaft; connected and cushioned knob engaging means; inclined structure on said means; rotatable mechanism connected to said member and on said means; and elements on said rotatable mechanism that engage said inclined structure.

2. In equipment having a container for component parts, a plurality of spaced rotatable shafts extending through a wall of said container, a frustro-conical parts control knob on each shaft, a control knob lock comprising a resilient member on and common to each shaft; connected and cushioned knob engaging means; inclined structure on said means; rotatable mechanism connected to said member and on said means; elements on said rotatable mechanism that engage said inclined structure and a groove in said means that receives said elements when said mechanism is rotated to lock said knobs against rotation.

3. In equipment having a container for component parts, a plurality of spaced rotatable shafts extending through a wall of said container, a frustro-conical parts control knob on each shaft, a control knob lock comprising a resilient member on and common to each shaft; connected and cushioned knob engaging means; inclined structure on said means; rotatable mechanism connected to said member and on said means; and elements on said rotatable mechanism that engage said inclined structure; said resilient member being a spring.

4. In equipment having a container for component parts, a plurality of spaced rotatable shafts extending through a wall of said container, a frustro-conical parts control knob on each shaft, a control knob lock comprising a resilient member on and common to each shaft; connected and cushioned knob engaging means; inclined structure on said means; rotatable mechanism connected to said member and on said means; and elements on said rotatable mechanism that engage said inclined structure; said means being at least a pair of cushioned rings.

5. In equipment having a container for component parts, a plurality of spaced rotatable shafts extending through a wall of said container, a frustro-conical parts control knob on each shaft, a control knob lock comprising a resilient member on and common to each shaft; connected and cushioned knob engaging means; inclined structure on said means; rotatable mechanism connected to said member and on said means; and elements on said rotatable mechanism that engage said inclined structure; said elements being at least one detent.

6. In equipment having a container for component parts, a plurality of spaced rotatable shafts extending through a wall of said container, a frustro-conical parts control knob on each shaft, a control knob lock comprising a resilient member on and common to each shaft; connected and cushioned knob engaging means; inclined structure on said means; rotatable mechanism connected to said member and on said means; elements on said rotatable mechanism that engage said inclined structure and a groove in said means that receives said elements when said rotatable mechanism is rotated to lock said knobs against rotation; said resilient member being a spring.

7. In equipment having a container for component parts, a plurality of spaced rotatable shafts extending through a wall of said container, a frustro-conical parts control knob on each shaft, a control knob lock comprising a resilient member on and common to each shaft; connected and cushioned knob engaging means; inclined structure on said means; rotatable mechanism connected to said member and on said means; elements of said rotatable mechanism that engage said inclined structure and a groove in said means that receives said elements when said rotatable mechanism is rotated to lock said knobs against rotation; said means being at least a pair of cushioned rings.

8. In equipment having a container for component parts, a plurality of spaced rotatable shafts extending through a wall of said container, a frustro-conical parts control knob on each shaft, a control knob lock comprising a resilient member on and common to each shaft; connected and cushioned knob engaging means; inclined structure on said means; rotatable mechanism connected to said member and on said means; elements on said rotatable mechanism that engage said inclined structure and a groove in said means that received said elements when said rotatable mechanism is rotated to lock said knobs against rotation; said elements being at least one detent.

9. In equipment having a container for component parts, a plurality of spaced rotatable shafts extending through a wall of said container, a frustro-conical parts control knob on each shaft, a control knob lock comprising a flat spring on and common to each shaft; connected and cushioned knob engaging rings; a pair of inclined surfaces on the connection for said rings; a rotatable mechanism connected to said spring and on said connection; a pair of spaced apart detents on said rotatable mechanism that engage said inclined surfaces; and a groove in said connection that receives said detents when said rotatable mechanism is rotated to lock said knobs against rotation.

References Cited in the file of this patent

UNITED STATES PATENTS

| | | |
|---|---|---|
| 1,106,432 | Wilcox | Aug. 11, 1914 |
| 2,028,237 | Och | Jan. 21, 1936 |
| 2,436,921 | Goldstine et al. | Mar. 2, 1948 |
| 2,643,632 | Sigmon Jr. | June 30, 1953 |
| 2,671,827 | Slay | Mar. 9, 1954 |
| 2,729,114 | Young | Jan. 3, 1956 |

FOREIGN PATENTS

| | | |
|---|---|---|
| 645,637 | France | July 3, 1928 |
| 835,500 | France | Sept. 26, 1938 |